United States Patent
Bushev et al.

(10) Patent No.: US 10,977,048 B2
(45) Date of Patent: Apr. 13, 2021

(54) DATA PROCESSING DEVICE FOR PROVIDING ACCESS TO A DATA STREAM

(71) Applicant: Huawei Technologies Co., Ltd., Shenzhen (CN)

(72) Inventors: Dmitry Vyacheslavovich Bushev, Moscow (RU); Alexander Vladimirovich Slesarenko, Moscow (RU); Yuriy Alexandrovich Zotov, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/984,022

(22) Filed: May 18, 2018

(65) Prior Publication Data

US 2018/0267808 A1    Sep. 20, 2018

Related U.S. Application Data (63) Continuation of application No. PCT/RU2015/000799, filed on Nov. 18, 2015.

(51) Int. Cl.
*G03G 13/34* (2006.01)
*G06F 9/38* (2018.01)
(Continued)

(52) U.S. Cl.
CPC .............. *G06F 9/3869* (2013.01); *G06F 1/04* (2013.01); *G06F 8/43* (2013.01); *G06F 9/3871* (2013.01);
(Continued)

(58) Field of Classification Search
CPC ..... G06F 9/3869; G06F 16/24568; G06F 1/04
See application file for complete search history.

(56) References Cited

U.S. PATENT DOCUMENTS

2007/0288649 A1    12/2007    Song et al.
2009/0030926 A1*   1/2009    Aharoni ............ G06F 16/24568
(Continued)

FOREIGN PATENT DOCUMENTS

| CN | 101739242 A | 6/2010 |
|---|---|---|
| CN | 104679841 A | 6/2015 |
| WO | 2015012711 A1 | 1/2015 |

OTHER PUBLICATIONS

Josef Svenningsson et al. ("Defunctionalizing Push Arrays" (Year: 2014).*

(Continued)

*Primary Examiner* — Doon Y Chow
*Assistant Examiner* — Abdou K Seye
(74) *Attorney, Agent, or Firm* — Conley Rose, P.C.

(57) ABSTRACT

A data processing device configured to provide access to a stream of data elements to a consumer. The data processing device is further configured to generate a data stream source by generating a first instance of a stream providing module such that the stream providing module provides the data stream in one of a push-mode and a pull-mode, wherein, in the push mode, the first instance of the stream providing module provides elements of the data stream according to a predefined schedule, wherein, in the pull mode, the first instance of the stream providing module provides elements of the data stream after receiving a data stream request from a consumer. Such a data processing device may provide the benefit of versatility as it can be transformed to both push and pull computation patterns.

20 Claims, 9 Drawing Sheets

(51) Int. Cl.
*G06F 16/2455* (2019.01)
*G06F 9/445* (2018.01)
*G06F 1/04* (2006.01)
*G06F 8/41* (2018.01)

(52) U.S. Cl.
CPC ........ *G06F 9/445* (2013.01); *G06F 16/24568* (2019.01)

(56) References Cited

U.S. PATENT DOCUMENTS

| | | | |
|---|---|---|---|
| 2010/0070607 A1* | 3/2010 | Khan | G06F 16/9535 709/217 |
| 2010/0131556 A1* | 5/2010 | Meijer | G06F 9/542 707/771 |
| 2012/0233616 A1 | 9/2012 | Moy et al. | |
| 2013/0097580 A1* | 4/2013 | Meijer | G06F 8/76 717/104 |
| 2013/0219009 A1 | 8/2013 | Bheemarajaiah et al. | |
| 2016/0267082 A1* | 9/2016 | Wong | G06F 16/164 |

OTHER PUBLICATIONS

Slesarenko, A., et al., "First-class Isomorphic Specialization by Staged Evaluation," WGP'14, Gothenburg, Sweden, In Proceedings of the 10th ACM SIGPLAN Workshop on Generic Programming, ACM, Aug. 31, 2014, pp. 35-46.
"ReactiveX, An API for asynchronous programming with observable streams," http://reactivex.io/, May 22, 2018, 5 pages.
Prokopec, A., et al., "A Generic Parallel Collection Framework," Part of the Lecture Notes in Computer Science book series (LNCS, vol. 6853), Euro-Par 2011 Parallel Processing, Jul. 31, 2010, pp. 136-147.
Coutts, D., et al., "Stream Fusion From Lists to Streams to Nothing at All," ICFP'07, Freiburg, Germany, Oct. 1-3, 2007, 12 pages.
Chakravarty, M. T. et al., "Functional Array Fusion," ICFP'01, Florence, Italy, Sep. 3-5, 2001, 12 pages.
Foreign Communication From a Counterpart Application, PCT Application No. PCT/RU2015/000799, English Translation of International Search Report dated Aug. 8, 2016, 5 pages.
Foreign Communication From a Counterpart Application, PCT Application No. PCT/RU2015/000799, English Translation of Written Opinion dated Aug. 8, 2016, 6 pages.
Machine Translation and Abstract of Chinese Publication No. CN104679841, Jun. 3, 2015, 16 pages.
Foreign Communication From a Counterpart Application, Chinese Application No. 201580084586.7, Chinese Office Action dated Nov. 19, 2019, 5 pages.
Foreign Communication From a Counterpart Application, Chinese Application No. 201580084586.7, Chinese Search Report dated Nov. 8, 2019, 2 pages.

* cited by examiner

DATA PROCESSING DEVICE FOR PROVIDING ACCESS TO A DATA STREAM

CROSS-REFERENCE TO RELATED APPLICATIONS

This application is a continuation of International Patent Application No. PCT/RU2015/000799 filed on Nov. 18, 2015, which is hereby incorporated by reference in its entirety.

TECHNICAL FIELD

The disclosure relates to a data processing device and to a data communication system. The data processing device is particularly configured to provide access to a stream of data elements to a consumer which can be communicatively connected to the data processing device.

BACKGROUND

Streams, sequences and lists of data elements are widely used concepts in the technical context of data communication devices. In the following, when referring to a stream of data elements, this phrase is to be understood as reference to multiple data elements which are arranged in a predetermined order and to which a consumer can have access. Further, a stream can be referred to as an iterable, sequential finite or infinite process on a data communication device that can emit at least one element at a time, the elements of which can be iterated over in a predetermined manner and order.

In an exemplary scenario, data elements are provided to one or more consumers by a server (i.e., the data communication device); where the server can be configured to act in a predetermined manner in order to meet the consumers requirements.

Several data communication devices may be configured such that they enable operations on sequences or streams of data elements. Generally speaking, streams, sequences and lists are similar in sense that they are iterable, which means that a consumer can somehow iterate over the elements of a stream. On the other hand, streams may be different in sense that they are represented as different data structures and thus have different behavior and properties.

Basically, there exist at least two methods for accessing data elements in iterable processes (streams). These two methods may be referred to as push mode and pull mode. In the pull mode the consumer asks for each item in the collection at a time as needed, and the call returns when the item is available. In the push mode the consumer registers a method that gets called each time a predetermined event occurs. It means the method is called whenever the next element in the collection becomes available.

It has been recognized that creation and modification of iterable processes may require much computational power and may thus lead to performance losses.

SUMMARY

There may be a need to reduce performance losses when providing access to data stream elements to consumers.

According to an aspect, a data processing device is provided. The data processing device is configured to provide access to a stream of data elements to a consumer. Further, the data processing device is configured to generate a data stream source by generating a first instance of a stream providing module such that the stream providing module provides the data stream in one of a push-mode and a pull-mode, wherein, in the push mode, the first instance of the stream providing module provides elements of the data stream according to a predefined schedule, wherein, in the pull mode, the first instance of the stream providing module provides elements of the data stream after receiving a data stream request from a consumer.

The data processing device can be a server and can be configured to provide access to data stream elements in either of the push-mode or the pull-mode. Basically, the data processing device is configured to use either of said modes such that it can provide access to the data stream elements by selecting one of said modes, which are both available.

The data processing device may comprise a memory module which contains data that are to be provided to at least one consumer. Further, the data processing device may be a server. The consumer can be a client which is connected to the data processing device and is configured to receive data provided by the data processing device.

The stream providing module may be a functional unit of the data processing device which handles the data stream elements and provides access to these elements. The stream providing module may be a processor or may be a programmable unit which is configured in a specific manner to operate as described herein.

The stream providing module may be configured to provide access to the data stream elements according to a request of the consumer. The way of providing the consumer access to the stream relates in particular to how the data stream elements are queried by the consumer.

As a result, a generic stream providing module is described which can adapt to different requirements (push/pull) and can meet specific needs of a consumer. The stream providing module can act as an interface to different data streams and several functions can be defined on it so that performance benefits can be achieved, independent of the specific implementation form of the stream providing module (push or pull, for example).

The data processing device as described above and hereinafter may provide versatility, since a stream pipeline defined once as a generic module can be transformed to both push and pull and optionally synchronous or asynchronous computation patterns. With other words in total four implementations of one stream pipeline may be obtained by automatic procedure. Further, the processing device provides for fusion optimization, since design of state transition system allows to fuse all transformations applied to stream as compositions of functions step and done, and hence high performance, since all transformations were fused into single stream, the resulting loop produced either for push or pull specialization, contains only function invocations. This may give the following performance benefits. First, computed values are placed directly on stack. It means that, implementation is cache-friendly and should not produce extra memory allocations. Second, resulting loop can be a subject to general-purpose compiler optimizations, such as inlining, loop unrolling, etc. Further, the data processing device may be described as a generic module which can be transformed in either of a push-module or a pull-module.

According to an embodiment, the data processing device is configured to generate the data stream source by generating the first instance of the stream providing module during an operating time of the data processing device.

Thus, the working mode of the stream providing module must not be defined in advance and can be set dynamically during operation of the data processing device.

According to an embodiment, the data processing device is configured to generate a second instance of the stream providing module.

Thus, the data processing device can function as a stream source for multiple consumers.

According to an embodiment, the second instance of the stream providing module is of a different type than the first instance of the stream providing module.

For example, the first instance of the stream providing module may be a push mode stream providing module wherein the second instance of the stream providing module may be a pull mode stream providing module.

Thus, the data processing device may function as a stream source for several consumers having different needs or requirements.

According to an embodiment, the data processing device is configured to receive a data stream query from a consumer, wherein the data stream query defines how to provide access to the stream of data elements.

For example, the consumer specifies the type of the stream providing module. Therefore, the data processing device can meet needs of a consumer even if the needs are not known to the data processing device in advance. One of the instances of the stream providing module is generated according to the specification in the data stream query.

According to an embodiment, the data processing device is configured to generate the data stream source based on the data stream query received from the consumer.

Thus, the consumer directly influences the type of the stream providing module. Therefore, the data processing device can adapt to a dynamically changing environment. i.e., it can automatically adapt to changing needs of consumers being connected to the data processing device.

According to an embodiment, the data processing device is configured to generate the first instance of the stream providing module such that the stream providing module provides the data stream in a synchronous mode.

In synchronous mode, the stream providing module is configured in such way that the consumer waits for the producer in order to obtain the message, i.e. a data stream element.

According to an embodiment, the data processing device is configured to generate the first instance of the stream providing module such that the stream providing module provides the data stream in an asynchronous mode.

In asynchronous mode, the stream providing module is configured in such way that the consumer does not wait for the producer. For example, instead of the actual message (data stream element), the consumer receives a notification that the requested data stream element will be provided. The consumer may work with the notification the same way as with the requested data stream element.

According to another aspect, a data communication system is provided. The data communication system comprises a data processing device as described above and hereinafter and at least one consumer which is communicatively connected to the data processing device. The consumer is configured to request a data stream from the data processing device by transmitting a data stream query to the data processing device.

The way of providing access to data streams by the data processing device may help to increase performance of data processing at the communication link between the producer and the consumer. For example, a response time of the data processing device to requests of the consumer may be handled in shorter time and the data stream elements arrive at the consumer earlier.

According to an embodiment, the data communication system comprises multiple distributed consumers which are communicatively connected to the data processing device, wherein the data processing device is configured to provide a stream providing module for any one of the multiple consumers.

A stream providing module can be assigned to any one of the multiple consumers. Further, any one of the stream providing modules is assigned exclusively to one, and only one, consumer of the multiple consumers. In case the stream providing module is implemented as a thread, the data processing device may contain several of such threads of which each one is assigned to one of the consumers.

Depending on the consumer, more than one stream providing module may be assigned to one consumer. This may be advantageous in case the consumer itself requires access to more than one data streams.

According to an embodiment, the data processing device is a first processor in a multi-processor system and the at least one consumer is a second processor in the multi-processor system.

The functioning of the data processing device may bring performance benefits in the data communication system since the stream providing module is generally defined before operating time and configured according to the required needs of any one of the consumers during operating time.

BRIEF DESCRIPTION OF THE DRAWINGS

Embodiments of the disclosure will be described with respect to the following figures, in which.

DETAILED DESCRIPTION OF EMBODIMENTS

Figure 1:
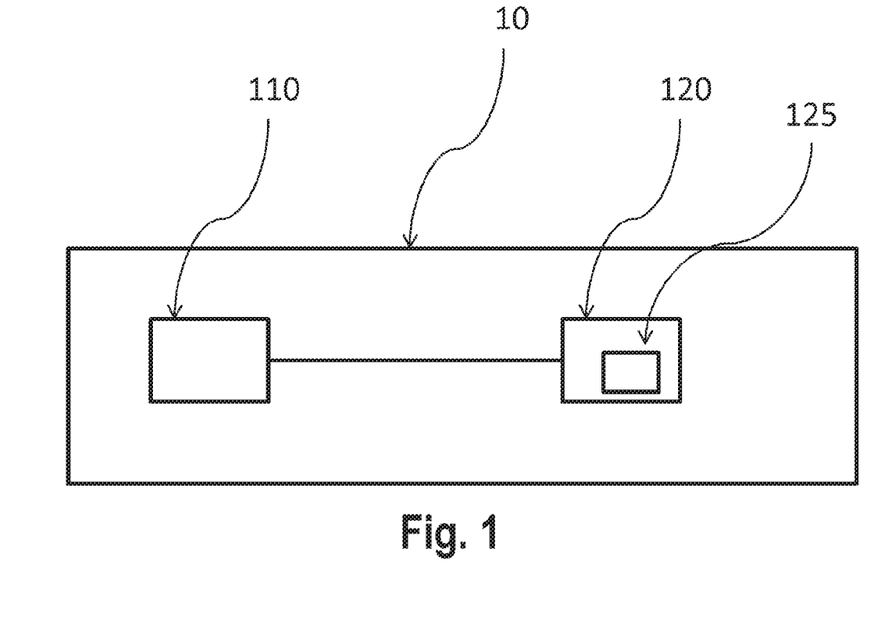
FIG. 1 schematically shows a data processing device.

FIG. 1 shows a data processing device 10 with a memory module 110 and a processor 120. A stream providing module 125 may be part of the processor 120, for example either a functional module implemented using several units of the processor 120 or a software running on the processor 120 and instructing the processor 120 to carry out a specific function.

The memory module 110 is configured to store multiple data elements which can be provided to consumers as data streams.

Figure 2:
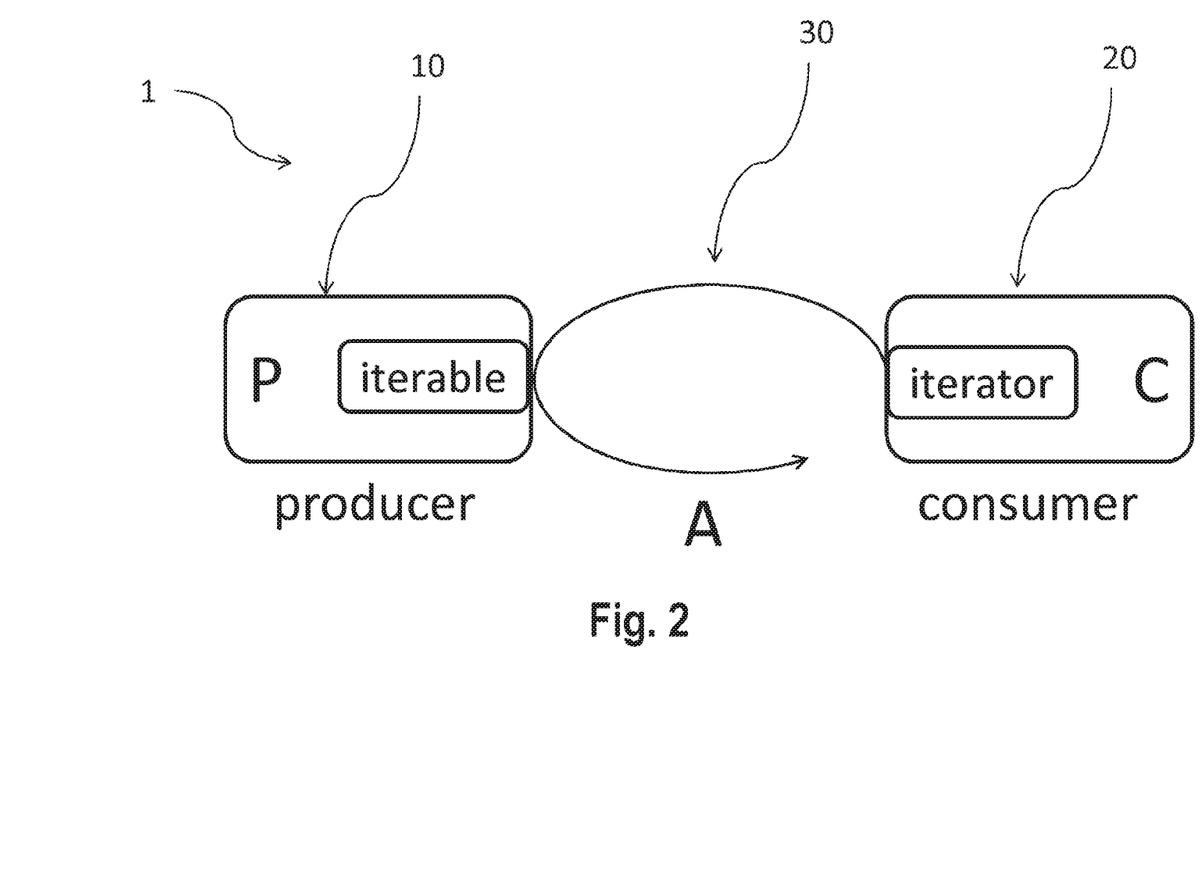
FIG. 2 schematically shows a data processing device acting in a pull mode.
Figure 3:
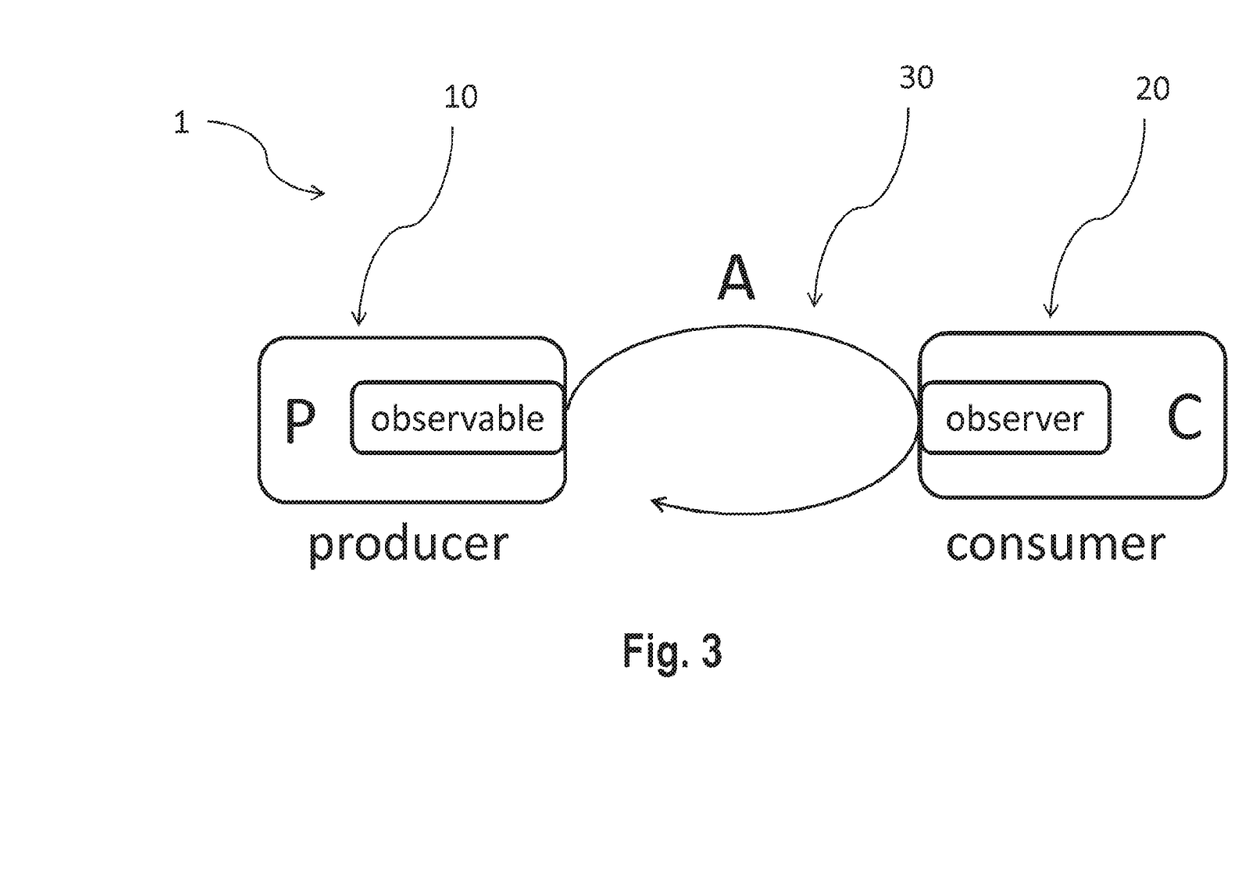
FIG. 3 schematically shows a data processing device acting in a push mode.

FIGS. 2 and 3 describe different approaches for accessing data streams. Generally, the data stream elements are provided by a data processing device 10 (also referred as producer) to a consumer 20 via a data transmission link 30. The producer 10 and consumer 20 may be computerized devices configured for automatic data processing. The data transmission link 30 can be any connection between two devices suitable for data transmission, for example a wired connection using any data transmission protocol and being of any type or a wireless connection, using optical signals or radio signals for signal transmission. These approaches may be referred to as push and pull. In the pull mode shown in FIG. 2, the consumer 20 asks for each item in the collection at a time as needed, and the call returns when the item is available. In the push mode shown in FIG. 3, the consumer 20 registers a method that gets called each time a predetermined event occurs. This means that the method is called whenever the next element in the collection becomes available.

Push-Pull mechanisms may be used in different domains, from application-level network communications in various distributed systems to system-level inter-process communications in multi-processor systems. They can be used as basic building blocks for creating higher-level protocols. The approach described herein enables for automatic conversion (specialization) of a stream providing module working in push or pull mode (optionally synchronous or asynchronous).

The stream providing module can be described as a data structure based on a state transition system, having defined a set of operations on it. In the proposed specialization algorithm all operations defined on the stream providing module eventually becomes fused into resulting primitive, which brings performance benefits.

Figure 4:
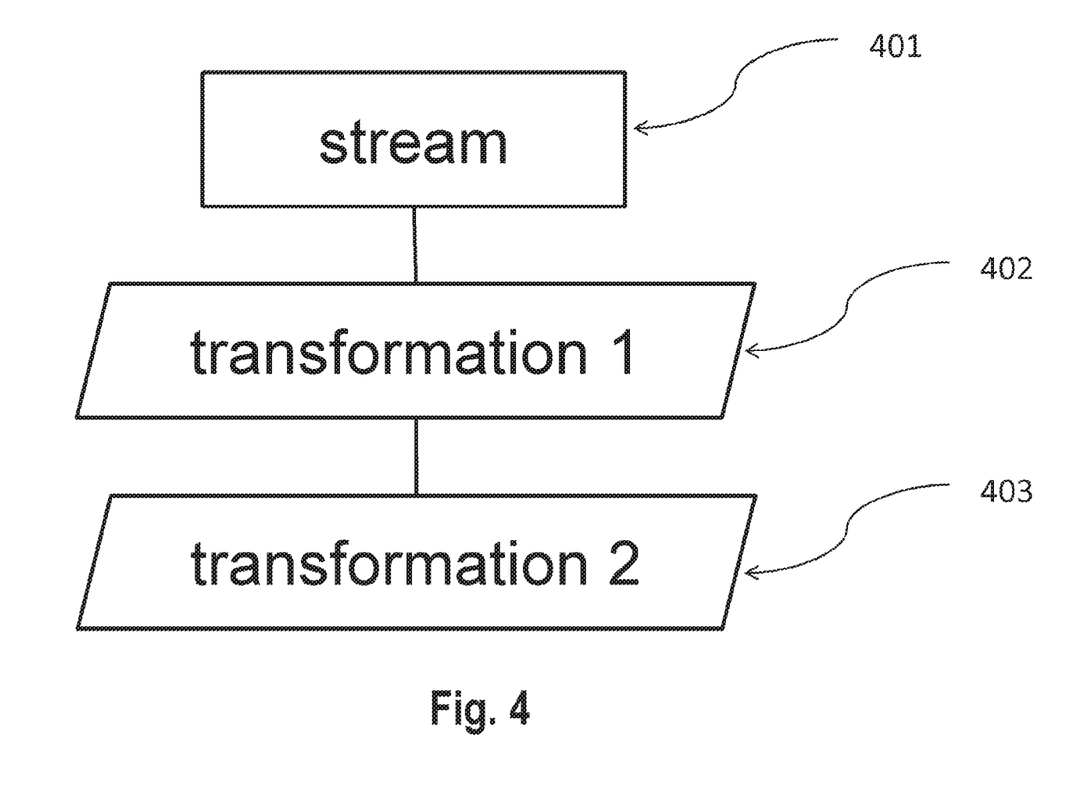
FIG. 4 schematically shows the approach of data stream transformation.

FIG. 4 describes a stream pipeline. Streams can be described as stream pipelines, as shown in FIG. 4. A pipeline includes a source stream 401 and a set of transformations (functions) 402, 403 on it. Example transforming functions can be filter(p), which filters elements of given stream according to predicate p or map(f) that transforms elements of the stream by applying function f to every element of the stream.

Stream processing can be optimized in different ways. One of the most important (which gives more performance benefits) is a stream fusion optimization. Fusion means that all transformations applied to original stream will be reflected in resulting stream without need for intermediate data structures, or any recomputations of previous results. Further, a fused stream can be traversed in single pass.

The data processing device described herein enables automatic push/pull specialization, optionally synchronous or asynchronous, without limiting the abilities of stream fusion as the functions are implemented within the stream providing module which is on a higher abstraction layer than the push or pull streams.

In the following, some terms of programming language and pseudo code are used to formally describe features and the functioning of the stream providing module and of the data processing device. However, this description does not limit the stream providing module and the data processing device to an implementation using software. The pseudo code is only used to describe the functioning of the stream providing module while it can be implemented using specific hardware.

The stream providing module can be described as a system with the following components of state, clock, next and done, as formally described in the following:

```
{
  state: S,
  clock: Clock,
  step: (S, Clock) => (S, Optionally B),
  done: (S, Clock) => (S, Y/N)
}
```

The stream providing module can work in push mode or in pull mode. As a result of this dual role or dual function of the stream providing module, a data stream must not be defined in advance but it can be specified after creation of a data stream or during runtime of the data processing device. Thus, performance benefits may be achieved.

Each component of the set of components being comprised by the stream providing module can be described as a functional block with inputs and outputs as follows. The component 'state' contains the current state S of a system. It can return its state (outbound) and save new state (inbound). 'Clock' emits ticks T (outbound) by request. 'Next' takes state S and tick T (inbound) and produces next state S and optionally produces a data element A (outbound). 'Done' takes state S and tick T (inbound) and produces next state S and the answer Yes/No to the question "is current stream empty".

The stream providing module defines a data stream of multiple elements. However, the stream providing module is only a set of four objects/components and an implementation may be needed that is able to get elements out of it. There are basically two different ways to read elements of a stream, using push and pull. Iterator represents pull-style, and Observable represents push-style. The stream providing module may be converted into Iterator or into Observable.

In the following, it is shown how to implement the stream providing module as Iterator. The Iterator can be defined as a set of two objects {hasNext, next}

```
{
  hasNext: Y/N,
  next: A
}
```

Figure 5:
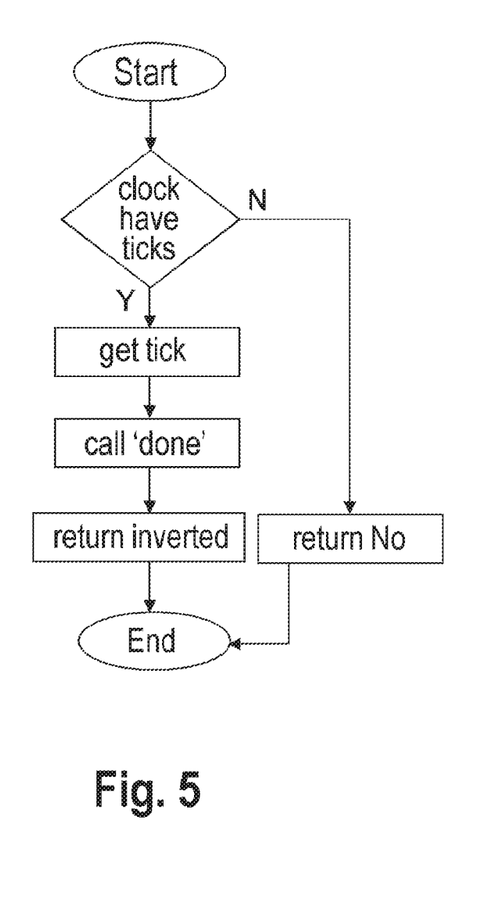
FIG. 5 schematically shows an implementation of the stream providing module.
Figure 6:
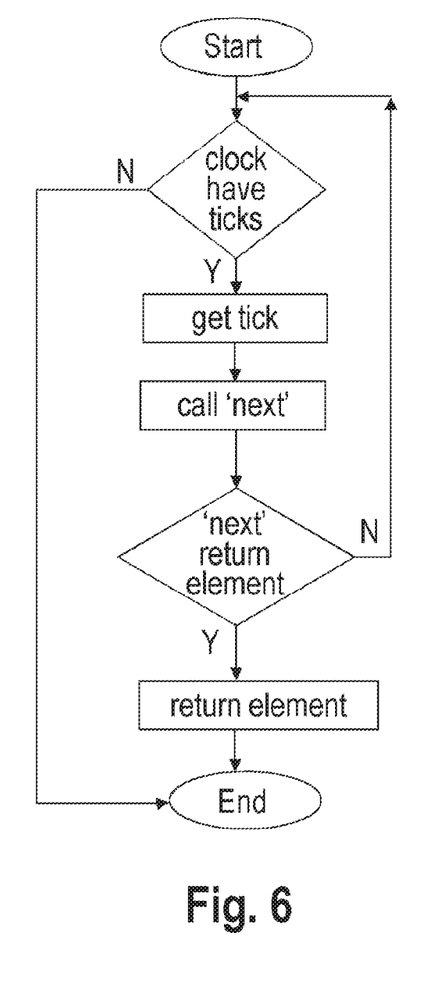
FIG. 6 schematically shows an implementation of the stream providing module.

To implement Iterator, hasNext and next can be implemented as shown in FIGS. 5 and 6, for example.

Alternatively, the stream providing module may be implemented as Observable. This requires operating with two objects. Observable and Observer.

Observer is a set of one object {onNext}:

```
{
  onNext: A => 0
}
```

Object 'onNext' takes next element of the stream, A (inbound) and applies some actions to it. 'onNext' logic may be defined by the consumer (e.g. the consumer or a user decides what to do with next element of the stream).

Observable is a set of one object {subscribe}:

```
{
  subscribe: Observer => 0
}
```

Figure 7:
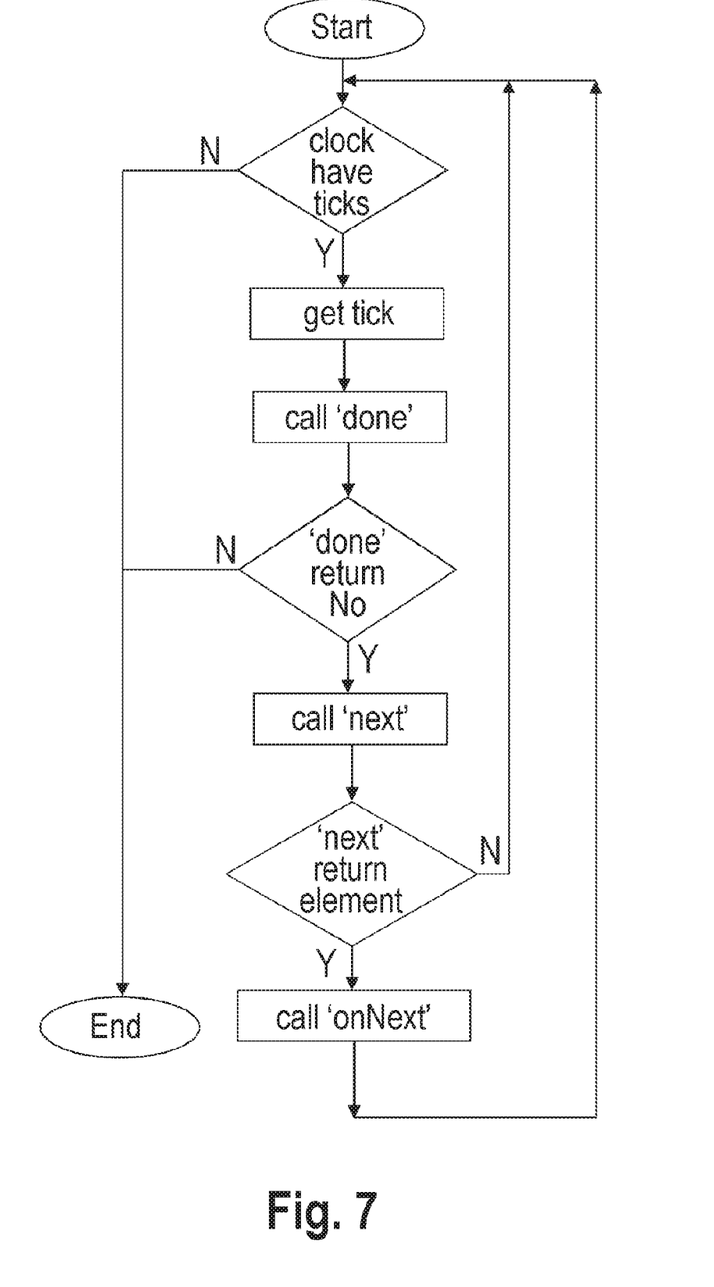
FIG. 7 schematically shows an implementation of the stream providing module.

Object 'subscribe' takes Observer (defined by consumer), and continually takes next message from stream and applies it to Observer. Further, 'subscribe' defines a cycle where next element A of the stream is obtained and applied (pushed) to onNext object of Observer. FIG. 7 shows an exemplary implementation of 'subscribe'.

The stream providing module may comprise functions as, provide a data structure that models the stream processing, and define stream processing operations which can be a subject of fusion optimization, provide a method for automatic specialization of this data structure to Push/Pull computation model, provide method for automatic specialization of this data structure to Sync/Async computation model.

Thus, automatic Push/Pull specialization of iterative processes, automatic Sync/Async specialization of iterative process, and fusion of operations defined on stream data type is enabled.

Exemplarily, the stream providing module can be described using a state transition system and methods of specialization to push and pull computation styles as in the following exemplary description.

An Iterator[A] having the following signature may first be provided:

```
class Iterator[A] {
    hasNext: Boolean
    next: A
}
```

In this example, "hasNext" method checks the presence of next element, and "next" method moves the pointer and returns following element.

Unit is a type that allows only one value, the value is written as ( ).

A|B is a coproduct of two types A and B (logical or), object of this type contains either value of type A or B.

(A, B) is a product (a pair) of two types A and B (logical and), object of this type contains both value of type A and value of type B.

A=>B is a function type, for given value of type A object of this type produces value of type B.

Then the signature of StreamM data type is as follows:

```
class StreamM[S, A, B](
    state: S,
    clock: Iterator[A],
    step: (S, Iterator[A]) => (S, Unit | B),
    done: (S, Iterator[A]) => (S, Boolean)
)
```

The stream providing module can be described as an (infinite) state transition system, where:
S—type of state;
A—type of element returned by clock (see below);
B—type of element returned by this stream;
state—initial state of a system;
clock—represents the source of the stream (outside of StateM). It can be Iterator[Unit], simple clock generator producing timing signal of type Unit. Or it can produce elements of source collection, if StreamM iterates on existing collection:
step—step function, for given state S and clock Iterator [A] it can produce next state S and optional value B; and
done—condition function, decides whether transition system should stop or can produce next element (by moving to the next step).

It is possible to specialize a sequential process of the stream providing module (according to the definition of StreamM primitive) according to following steps.

Construct computation pipeline using StreamM primitive. This step includes construction of the stream using one of factory methods or from existing source, and optionally define transformations on it.

Fuse operations on the pipeline into new StreamM state transition system. On this step rewriting rules of staged evaluation framework are applied to fuse transformations of the pipeline into new StreamM primitive.

Specialize resulting StreamM to push or pull method. On this step, one of rewriting rules of staged evaluation framework is applied to convert stream into iterable (pull) or observable (push) object.

Optionally, resulting StreamM is specialized to sync or async computation style.

The construction of the computation pipeline is described in the following by means of examples which are not construed as limiting the scope of the disclosure.

Sequential processes can be constructed by defining state and clock initial conditions and implementing functions step and done. Different data streams can be constructed as shown in the following: unit function creates infinite stream producing elements of type Unit.

```
def unit: StreamM[Unit, Unit, Unit] =
    StreamM(
        ( ),
        Iterator.continually(( )),
        (s,c) => (s, Right(( ))),
        (s,c) => (s, false)
    )
```

Where initial state is unit, clock is an infinite iterator that return unit elements, function step return unit regardless of input value and stop condition always return false. Single function creates stream that contains of single element of type A.

```
def single(a: A): StreamM[Boolean, Unit, A] =
    StreamM(
        false,
        Iterator.continually(( )),
        (s,c) => (true, Right(a)),
        (s,c) => (s, s)
    )
```

StreamM with state of type Boolean is created, and it indicates whether this stream is completed or not. In the step function true is returned (stream is completed) as a next state of transition system, and function done just relies (returns) state. That means that after the first call of step function, done will return true which means that stream is completed. From function creates stream from iterator of given collection.

```
def from(it: Iterator[A]): StreamM[Unit, A, A] =
    StreamM(
        ( ),
        it,
        (s,c) => (s, Right(c.next( ))),
        (s,c) => (s, !c.hasNext( ))
    )
```

In this case source iterator becomes the clock of the stream, and function step, just takes its next element, and function done checks if clock completed or not.

Figure 8:
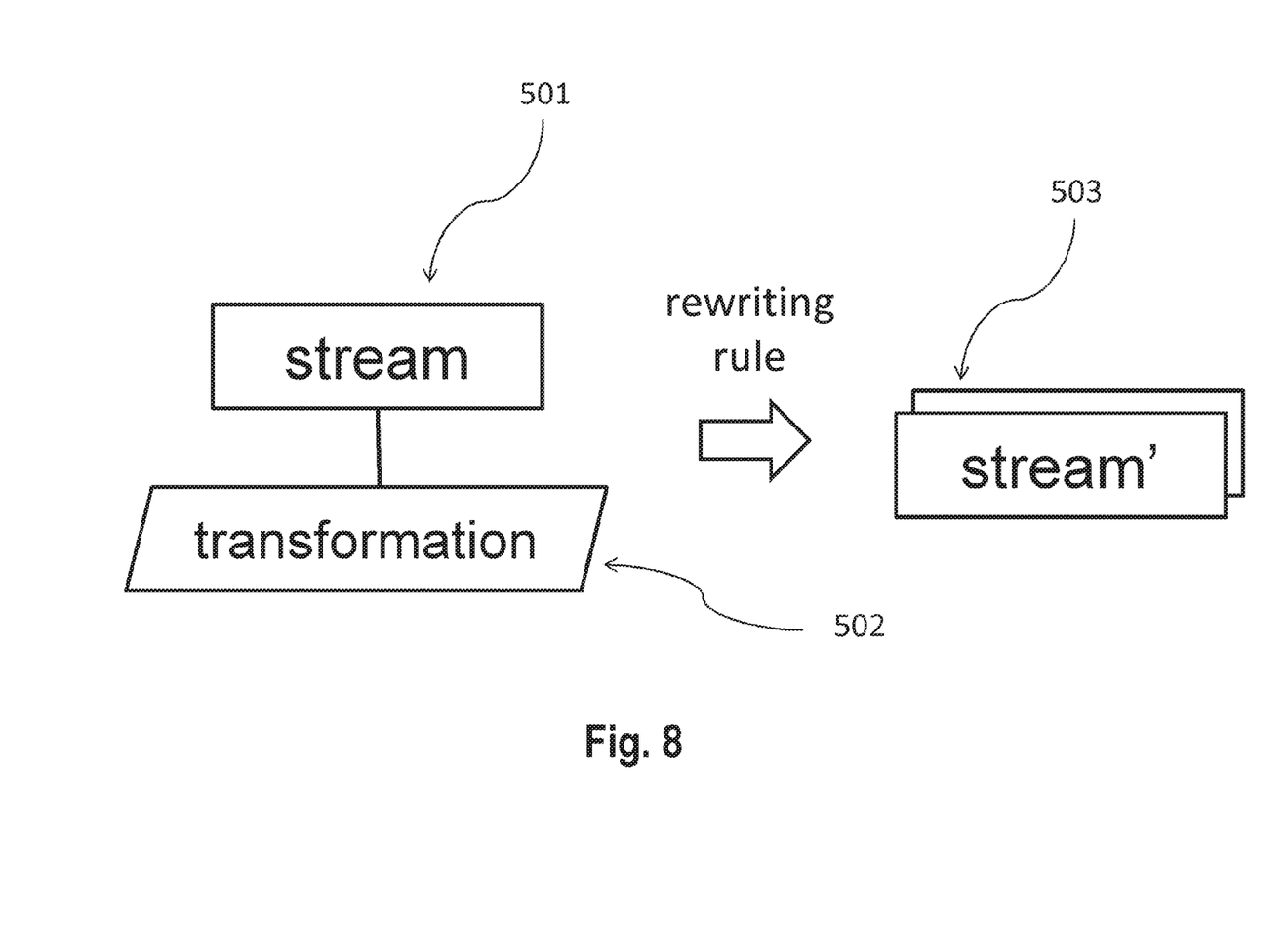
FIG. 8 schematically shows the approach of data stream fusion.
Figure 9:
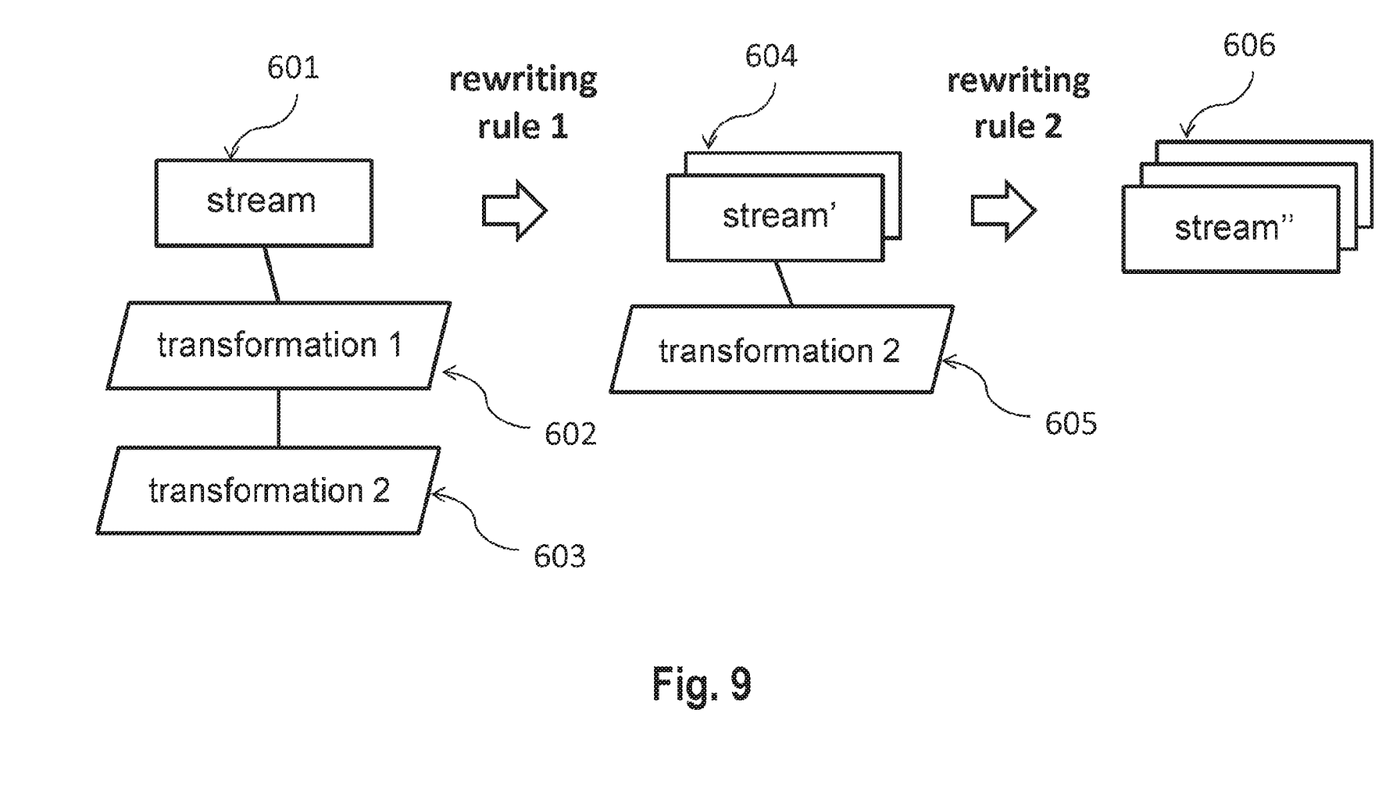
FIG. 9 schematically shows the approach of data stream fusion as a continuous process.

FIGS. 8 and 9 schematically show fusion of operations. Again, this kind of describing the function of the stream providing module is used to formally describe how the stream providing module works. In a staged evaluation framework with graph rewriting, fusion of operations can be implemented by graph rewriting of two sub-graphs (stream 501 with a transformation 502) into single graph, fused stream (i.e., Stream') 503. The whole fusion process is a continuous application of fusion rewriting rules as shown in FIG. 9 with stream 601, transformations (i.e. transformation 1, transformation 2) 602, 603. stream' 604 and transformation 2 605 as well as stream" 606.

The examples below show fusion rewriting rules for functions filter(p), which filters elements of given stream according to predicate p, and map(f) that transforms elements of the stream by applying function f to every element of the stream.

```
def fuse_filter(state, clock, next, done, p) =
  new StreamM(
    state,
    clock,
    {
      (s,c) =>
        (ns, el) = step(s, c)
        val filtered = p(el)
        val result = if (filtered) then el else ( )
        (ns, result)
    },
    done
  )
```

Rewriting rule fuse_filter fuses given StreamM, represented as its components state, clock, step and done with transformation function filter(p) represented as its component p. In this algorithm, filtering logic is applied in the step of resulting stream. First it calls step of the parent stream to get next element el, then applies predicate function p and checks whether element el or unit ( ) should be returned as a result with a new state of the Stream M.

```
def fuse_map(state, clock, next, done, f) =
  new StreamM(
    state,
    clock,
    {
      (s,c) =>
        (ns, el) = step(s, c)
        (ns, f(el))
    },
    done
  )
```

Rewriting rule fuse_map fuses given StreamM, represented as its components state, clock, step and done with transformation function map(f), represented as its component f. In this algorithm, function f of the map transformation is applied in the step function of resulting stream. First it calls step of the parent stream to get the next element el and then applies f to this element. Result is returned in a pair (ns, f(el)) with the new state of StreamM.

It should be noted that in the formal description above and hereinafter, StreamM may refer to the stream providing module and defines its functioning.

Figure 10:
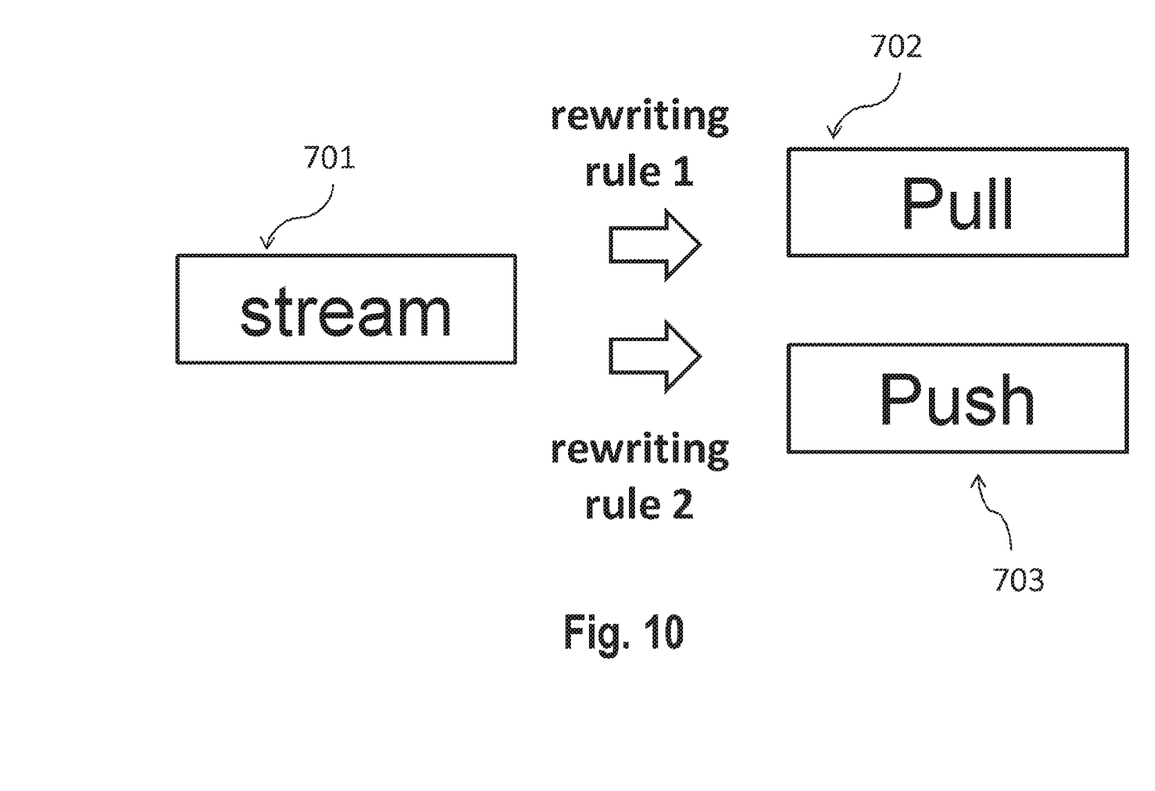
FIG. 10 schematically shows a push-pull specialization of a stream providing module of the data processing device.

FIG. 10 schematically shows push/pull specialization of the stream providing module. In particular, it is schematically shown how stream 701 is specialized to pull-mode 702 or push-mode 703.

In a staged evaluation framework with graph rewriting, specialization can also be thought as a function that rewrites one set of graphs to other. Based on this, push and pull specializations are defined as functions from StreamM to specific implementation as shown in FIG. 10.

Pull specialization is a function that for given StreamM object results in an Iterator. Iterator interfaces have methods hasNext, which checks that iterator is not empty, and next which returns consequent element.

```
def specialize_pull(state, clock, next, done) = new Iterator
{
  var st = state
  def hasNext = {
    st, complete = done(st, clock)
    return !complete
  }
  def next = {
    st, elem = step(state, clock)
    return elem
  }
}
```

The exemplary code above shows rewriting function that for given StreamM, represented as its components state, clock, next and done in an arguments of function, returns Iterator. In this implementation, hasNext function of Iterator checks if the stream is completed by calling its done function, and saving new state. next function returns element produced by step function of the stream.

Push specialization is a function that for given StreamM object results in an Observable. Observable interface contains subscribe method which for given Observer invokes its onNext method.

```
def specialize_push(state, clock, next, done) = new
Observable {
  var st = state
  def subscribe(o: Observer) =
    while (st, complete = done(st, clock) && !complete) {
      st, elem = step(st, clock)
      o.onNext(elem)
    }
}
```

The exemplary code above shows rewriting function that for given StreamM, represented as its components state, clock, next and done, returns Observable. In this implementation, subscribe method of Observer in a cycle checks if the stream is completed by calling its done function and saving new state. If the stream is not completed, it invokes onNext function of observer with the consequent element elem of the stream.

Push-pull specialization can produce either synchronous or asynchronous concrete implementation. Above, pull specialization and push specialization describe rewriting algorithm for synchronous case. In this concrete case, convert synchronous pull or push object into asynchronous relates to producer-consumer problem. Such conversion takes place during specialization process.

Exemplary code below shows functions specialize_pull_async and specialize_push_async as an exemplary conversion algorithm.

```
def specialize_pull_async(delegate) = new Iterator {
  val queue = new Queue( )
  new Thread( ) {
```

```
        while(delegate.hasNext( ))
            queue.put(delegate.next( ))
    }
    def hasNext = {
        !queue.isEmpty
    }
    def next = {
        queue.take( )
    }
}
```

In the specialize_pull_async method above producer of the elements, delegate iterator and consumer, the resulting new Iterator resides on different threads and communicate through queue. Producer is started on separate thread and starts filling the queue. Consumer in its turn, receives elements from the queue.

```
def specialize_push_async(delegate) = new Observable {
    def subscribe(observer) =
        new Thread {
            delegate.subscribe(observer)
        }
}
```

In case of specialize_push_async it is just needed to invoke the logic of delegate observable on the separate thread.

The data processing device as described above and hereinafter may provide versatility (a stream pipeline defined once as a StateM primitive can be transformed to both push and pull and optionally sync or async computation patterns. It means that in total four implementations of one stream pipeline are obtained by automatic procedure), fusion optimization (design of StateM state transition system allows to fuse all transformations applied to stream as compositions of functions step and done), performance (based on previous statement, since all transformations were fused into single stream, the resulting loop produced either for push or pull specialization, contains only function invocations. This may give the following performance benefits first, computed values are placed directly on stack. It means that, implementation is cache-friendly and should not produce extra memory allocations, second, resulting loop can be a subject to general-purpose compiler optimizations, such as inlining, loop unrolling, etc.).

What is claimed is:

1. A server comprising:
a memory having a plurality of instructions stored thereon; and a processor coupled to the memory, wherein the instructions cause the processor to be configured to:
receive a first data stream query for a data stream of data elements, wherein the first data stream query comprises a push indication;
receive a second data stream query for the data stream, wherein the second data stream query comprises a pull indication;
obtain a state transition system configured with operations for providing access to a-the data stream;
apply, responsive to the first data stream query, first graph rewriting rules to fuse the state transition system with a first transformation to create a first instance of the state transition system configured in a push mode;
apply, responsive to the second data stream query, second graph rewriting rules to fuse the state transition system with a second transformation to create a second instance of the state transition system configured in a pull mode and provide the data stream in both the push mode and the pull mode.

2. The server of claim 1, wherein the instructions further cause the processor to be configured to create the first instance of the state transition system during an operating time of the server.

3. The server of claim 1, wherein the instructions further cause the processor to be configured to create the second instance of the state transition system during an operating time of the server.

4. The server of claim 1, wherein the first data stream query comprises either an asynchronous indicator or a synchronous indicator, and wherein the second data stream query comprises either the asynchronous indicator or the synchronous indicator.

5. The server of claim 4, wherein the instructions further cause the processor to:
generate the second instance of the state transition system to provide the data elements of the data stream in a synchronous mode when the second data stream query comprises the synchronous indicator; and
generate the second instance of the state transition system to provide the data elements of the data stream in an asynchronous mode when the second data stream query comprises the asynchronous indicator.

6. The server of claim 4, wherein the instructions further cause the processor to be configured to generate the first instance of the state transition system to provide the data elements of the data stream in a synchronous mode when the first data stream query comprises the synchronous indicator.

7. The server of claim 4, wherein the instructions further cause the processor to be configured to generate the first instance of the state transition system to provide the data elements of the data stream in an asynchronous mode when the first data stream query comprises the asynchronous indicator.

8. A data communication system, comprising
a server configured to:
receive a first data stream query for a data stream of data elements, wherein the first data stream query comprises a push indication;
receive a second data stream query for the data stream, wherein the second data stream query comprises a pull indication;
obtain a state transition system configured with operations for providing access to the data stream;
apply, responsive to the first data stream query, first graph rewriting rules to fuse the state transition system with a first transformation to create a first instance of the state transition system configured in a push mode;
apply, responsive to the second data stream query, second graph rewriting rules to fuse the state transition system with a second transformation to create a second instance of the state transition system configured in a pull mode; and
provide the data stream in both the push mode and the pull mode; and
at least one client communicatively coupled to the server and configured to receive the data stream from the server using at least one of the push mode or the pull mode.

9. The data communication system of claim 8, further comprising a plurality of distributed clients communicatively coupled to the server, wherein the server is further configured to generate an instance of the state transition system for any one of the clients upon request.

10. The data communication system of claim 8, wherein the server comprises a first processor in a multi-processor system, and wherein the at least one client comprises a second processor in the multi-processor system.

11. The system of claim 8, wherein the server is further configured to create the first instance to use either a synchronous implementation or an asynchronous implementation.

12. The system of claim 11, wherein the server is further configured to create the second instance to use either a synchronous implementation or an asynchronous implementation.

13. A data processing method implemented by a server, wherein the method comprises:
   receiving a first data stream query for a data stream of data elements, wherein the first data stream query comprises a push indication;
   receiving a second data stream query for the data stream, wherein the second data stream query comprises a pull indication;
   obtaining a state transition system configured with operations for providing a client with access to the data stream;
   applying, responsive to the first data stream query, first graph rewriting rules to fuse the state transition system with a first transformation to create a first instance of the state transition system configured in a push mode;
   applying, responsive to the second data stream query, second graph rewriting rules to fuse the state transition system with a second transformation to create a second instance of the state transition system configured in a pull mode; and
   providing the data stream in both the push mode and the pull mode.

14. The method of claim 13, further comprising creating the first instance of the state transition system during an operating time of the server.

15. The method of claim 13, further comprising creating the second instance of the state transition system during an operating time of the server.

16. The method of claim 13, wherein the first data stream query comprises either an asynchronous indicator or a synchronous indicator, and wherein the second data stream query comprises either the asynchronous indicator or the synchronous indicator.

17. The method of claim 16, further comprising generating the first instance of the state transition system to provide the data elements of the data stream in a synchronous mode when the first data stream query comprises the synchronous indicator.

18. The method of claim 16, further comprising generating the first instance of the state transition system to provide the data elements of the data stream in an asynchronous mode when the first data stream query comprises the asynchronous indicator.

19. The method of claim 16, further comprising generating the second instance of the state transition system to provide the data elements of the data stream in a synchronous mode when the second data stream query comprises the synchronous indicator.

20. The method of claim 16, further comprising generating the second instance of the state transition system to provide the data elements of the data stream in an asynchronous mode when the second data stream query comprises the asynchronous indicator.

* * * * *